(12) United States Patent
Grossklas et al.

(10) Patent No.: US 8,819,224 B2
(45) Date of Patent: Aug. 26, 2014

(54) HEALTH AND WELFARE MONITORING OF NETWORK SERVER OPERATIONS

(75) Inventors: Brian J. Grossklas, Park Ridge, IL (US); John T. Schwartz, Richardson, TX (US); Paul Jacob Abernathy, Charlotte, NC (US); Angelito A. Reyes, Chatsworth, CA (US); Amanda Thomas, Jacksonville, FL (US); Julie Mathew, Chennai (IN); Jameel Ahmed Jamal, Chennai (IN); Mathan Kumar, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 208 days.

(21) Appl. No.: 13/192,952

(22) Filed: Jul. 28, 2011

(65) Prior Publication Data

US 2013/0031238 A1 Jan. 31, 2013

(51) Int. Cl.
*G06F 11/32* (2006.01)
*G06F 11/34* (2006.01)
*H04L 12/26* (2006.01)
*H04L 12/24* (2006.01)

(52) U.S. Cl.
CPC ............. *H04L 43/0817* (2013.01); *H04L 41/22* (2013.01); *H04L 41/069* (2013.01)
USPC ............................ 709/224; 709/223; 370/252

(58) Field of Classification Search
None
See application file for complete search history.

(56) References Cited

U.S. PATENT DOCUMENTS

| 6,317,787 | B1 * | 11/2001 | Boyd et al. ..................... 709/224 |
| 7,581,006 | B1 * | 8/2009 | Lara et al. ..................... 709/226 |
| 2005/0065753 | A1 * | 3/2005 | Bigus et al. ..................... 702/186 |
| 2008/0134046 | A1 * | 6/2008 | Gray et al. ..................... 715/736 |
| 2009/0328050 | A1 * | 12/2009 | Liu et al. ....................... 718/104 |

* cited by examiner

*Primary Examiner* — Jung Kim
*Assistant Examiner* — Janusz Kusyk
(74) *Attorney, Agent, or Firm* — Michael A. Springs; Moore & Van Allen PLLC; Nicholas C. Russell

(57) ABSTRACT

Methods, systems and computer program products for monitoring and analysis of network servers and web analytics programs are disclosed. A monitoring program, for example, is configured to monitor the status of web analytics program(s) associated with one or more network servers. The monitoring program may monitor server-specific metrics such as server free disk space, server available memory, server on-line/off-line status, report processing time, difference between system time and log file time, table size details, etc. The program may be configured to present status indicators to the user that are indicative of the health of the web analytics program and/or server. A user may receive an alert generated by the monitoring program regarding a change in web analytics program status. Additionally, the monitoring program may be configured to automatically take corrective action to remedy or prevent a critical event that may cause loss of data or delay web analytics reporting.

29 Claims, 7 Drawing Sheets

| LOG  FILES STATUS | | |
|---|---|---|
| SERVER NAME (DCSBUSY FILE COUNT) [ZONE] | SERVER STATUS | SYSTEM DATE & TIME |
| SERVER 1   (1) [EST] | ▨ | DATE 1, TIME 1 |
| SERVER 2   (1) [EST] | ▨ | DATE 1, TIME 1 |
| SERVER 3   (6) [EST] | ▨ | DATE 1, TIME 1 |
| SERVER 4   (0) [EST] | ▨ | DATE 1, TIME 1 |
| SERVER 5   (3) [PST] | ▨ | DATE 1, TIME 2 |
| SERVER 6   (1) [PST] | ▨ | DATE 1, TIME 2 |
| SERVER 7   (6) [PST] | ▨ | DATE 1, TIME 2 |
| SERVER 8   (4) [PST] | ▨ | DATE 1, TIME 2 |
| SERVER 9   (56) [CST] | ▨ | DATE 1, TIME 3 |
| SERVER 10  (54) [CST] | ▨ | DATE 1, TIME 3 |

LEGENDS
▨ DENOTES ALL THE DCSBUSY FILES ARE PROCESSING WITHIN [Y TIME]
▨ DENOTES ALL/FEW DCSBUSY FILES ARE PROCESSING WITHIN [Z TIME BUT] > Y TIME
▨ DENOTES DCSBUSY FILES ARE PROCESSING BEYOND [Z TIME] / DCSBUSY FILES ARE NOT AVAILABLE

| FILE NAME | | LOG FILE TIME | STATUS |
|---|---|---|---|
| LOGFILE1 | .XXXX | DATE 1, TIME 1 | |
| LOGFILE2 | .XXXX | DATE 1, TIME 1 | |
| LOGFILE3 | .XXXX | DATE 1, TIME 2 | |

SERVER : SERVER 5    (EST)
SYSTEM DATE & TIME : DATE 1, TIME 1

CLOSE

FIG. 3B

| TAGGING SERVER DISK SPACE STATUS | | | | |
|---|---|---|---|---|
| SERVER NAME [ZONE] | SERVER STATUS | SYSTEM DATE & TIME | TOTAL DISK SPACE (IN GB) | FREE DISK SPACE (IN GB) |
| SERVER 1 [EST] | ▨ | DATE 1, TIME 1 | 80 | 74.07 |
| SERVER 2 [EST] | ▨ | DATE 1, TIME 1 | 80 | 74.14 |
| SERVER 3 [EST] | ▨ | DATE 1, TIME 1 | 80 | 74.08 |
| SERVER 4 [EST] | ▨ | DATE 1, TIME 1 | 80 | 74.08 |
| SERVER 5 [PST] | ▨ | DATE 1, TIME 2 | 80 | 74.09 |
| SERVER 6 [PST] | ▨ | DATE 1, TIME 2 | 80 | 74.28 |
| SERVER 7 [PST] | ▨ | DATE 1, TIME 2 | 80 | 73.95 |
| SERVER 8 [PST] | ▨ | DATE 1, TIME 2 | 80 | 74.08 |
| SERVER 9 [CST] | ▨ | DATE 1, TIME 3 | 79.99 | 32.73 |
| SERVER 10 [CST] | ▨ | DATE 1, TIME 3 | 79.99 | 22.98 |

LEGENDS
▨ DENOTES FREE DISK SPACE IS GREATER THAN ⊠ GB
▨ DENOTES FREE DISK SPACE IS LESS THAN ⊠ GB

| TABLE SIZE VERIFICATION | | | | |
|---|---|---|---|---|
| PROFILE NAME | PAGES ANALYSIS STATUS | PAGES REPORT STATUS | VISITORS ANALYSIS STATUS | VISITORS REPORT STATUS |
| PROFILE 1 | ▨ | ▨ | ▨ | ▨ |
| PROFILE 2 | ▨ | ▨ | ▨ | ▨ |
| PROFILE 3 | ▨ | ▨ | ▨ | ▨ |
| PROFILE 4 | ▨ | ▨ | ▨ | ▨ |
| PROFILE 5 | ▨ | ▨ | ▨ | ▨ |
| PROFILE 6 | ▨ | ▨ | ▨ | ▨ |
| PROFILE 7 | ▨ | ▨ | ▨ | ▨ |
| PROFILE 8 | ▨ | ▨ | ▨ | ▨ |
| PROFILE 9 | | | | ▨ |

LEGENDS
▨ DENOTES THE REPORTS ARE PROCESSING WITHIN PRE-DEFINED LIMIT
▨ DENOTES THE REPORT HAS EXCEEDED PRE-DEFINED LIMIT

HEALTH AND WELFARE MONITORING OF NETWORK SERVER OPERATIONS

BACKGROUND

As the Internet age continues to grow, it is becoming more and more important for businesses to compile and analyze data regarding traffic on network servers. Web analytics programs for collecting and analyzing such data. One particular program available that is useful for web analytics is described in U.S. Pat. Nos. 6,112,238; 6,317,787; 6,925,442; and 7,185,085, which are incorporated by reference herein in their entirety.

With such current web analytics programs, there are two main approaches to collecting the server data. One approach is log file analysis that is the examination of log files in which the server records all of its transactions. The other approach is page tagging in which JavaScript® is utilized to notify a third-party server when a page is rendered by a web browser. The programs compile the data and reports may be generated to display information about web server activity, such as general statistics, most requested pages, least requested pages, most downloaded files, activity level by day of week, activity level by hour, bandwidth, page not found (404) errors, server errors, referring sites, referring URLs, search engines, search phrases, browsers or platforms, visiting spiders, most-used platforms and operating systems, etc.

The amount of data that is collected on a network server may be immense, especially for servers that support high network traffic. Thus, the generation of periodic reports (for example, daily reports, weekly reports, etc.) that compiles all the data may be a daunting task. The problem is magnified when technical personnel must produce one or more periodic reports for a plurality of different servers.

One of the problems associated with current web analytics programs is that in the retrieving of data and creation of various reports for a multitude of servers, it is difficult to assess the "health" of the server and/or web analytics program to anticipate and prevent potential problems in collecting the data and generating reports. Indeed, oftentimes the web analytics program may encounter problems that slow or stall the collection of data/generation of reports; however, the problems may not be recognized and/or rectified until after-the-fact and data may be lost or the client may be unable to view a particular periodic report until a later time than desired. As such, a need currently exists for a monitoring tool useful to assess the health of servers and/or the web analytics program during data processing.

SUMMARY OF INVENTION

The following presents a summary of certain embodiments of the present invention. This summary is not intended to be a comprehensive overview of all contemplated embodiments, and is not intended to identify key or critical elements of all embodiments nor delineate the scope of any or all embodiments. Its sole purpose is to present certain concepts and elements of one or more embodiments in a summary form as a prelude to the more detailed description that follows.

Methods, systems and computer program products are described herein that provide for monitoring and analysis of network servers and web analytics programs. For example, a monitoring program configured to monitor the status of web analytics program(s) associated with one or more network servers is contemplated herein. The monitoring program may monitor server-specific metrics such as server free disk space, server available memory, server on-line/off-line status, report processing time, difference between system time and log file time, table size details, etc. In monitoring such data, the program may be configured to present status indicators to the user wherein the status indicator may be indicative of the health of the web analytics program. Such a tool is beneficial, especially in instances such that a user must monitor or is otherwise responsible for web analytics data for a plurality of network servers. Indeed, in some embodiments, a user may receive an alert generated by the monitoring program regarding a change in web analytics program status. Further, the monitoring program may be configured, in some embodiments, to automatically take corrective action to remedy or prevent a critical event that may cause loss of data or delay web analytics reporting.

To the accomplishment of the foregoing and related objectives, the embodiments of the present invention comprise the function and features hereinafter described. The following description and the referenced figures set forth a detailed description of the present invention, including certain illustrative examples of the one or more embodiments. The functions and features described herein are indicative, however, of but a few of the various ways in which the principles of the present invention may be implemented and used and, thus, this description is intended to include all such embodiments and their equivalents.

In one embodiment, a method for monitoring a web analytics program is provided. The method includes receiving server data from at least one network server. The method further includes summarizing at least a portion of the server data in one or more periodic reports utilizing a web analytics program. Additionally, the method includes communicating with the at least one network server and/or the web analytics program via a separate monitoring program where the monitoring program is configured to monitor server-specific metrics. The method further includes presenting a first status indicator signifying a healthy status of the web analytics program in response to each of the server-specific metrics monitored being within acceptable values. The method may also include presenting a second status indicator signifying that at least one server-specific metric monitored being outside of an acceptable value.

In some embodiments of the method, the second status indicator is a cautionary status indicator signifying that precautionary action may be necessary to prevent a critical event. In some such embodiments, the method may further include presenting a third status indicator signifying that at least one server-specific metric monitored is indicative of a critical event. The critical event may include an inability of the web analytics program to retrieve at least a portion of the server data in order to summarize the data in the one or more periodic reports within a predetermined time period. In further embodiments, the second status indicator is a critical status indicator signifying that at least one server-specific metric monitored is indicative of a critical event.

In some embodiments of the method, the receiving server data includes receiving server data from a plurality of network servers. In some embodiments, the server-specific metrics comprise at least one of server free disk space, server available memory, server on-line/off-line status, report processing time, difference between system time and log file time, and table size details.

In some embodiments, the method further includes generating an alert in response to at least one server-specific metric monitored being outside of an acceptable value. The alert may include at least one of an SMS communication, an email, or an audible alarm.

Additionally, in some embodiments of the method, the monitoring program may automatically take corrective action in response to one or more monitored server-specific metrics being outside of an acceptable value. The monitoring program may include a graphical user interface. In some particular embodiments, the web analytics program includes current web analytics products as mentioned above.

In another embodiment, a system for web analytics is provided. The system includes a plurality of network servers that include or are otherwise in communication with a web analytics program configured to summarize server data in one or more periodic reports. The system additionally includes a monitoring program. The monitoring program is configured to communicate with the web analytics program and monitor server-specific metrics associated with each server. The monitoring program is additionally configure to present a first status indicator signifying a healthy status of the web analytics program in response to each of the server-specific metrics monitored being within acceptable values. Furthermore, the monitoring program may be configured to present a second status indicator signifying that at least one server-specific metric monitored is outside of an acceptable value.

In some embodiments of the system, the second status indicator is a cautionary status indicator signifying that precautionary action may be necessary to prevent a critical event. In some such embodiments, the monitoring program may be further configured to present a third status indicator signifying that at least one server-specific metric monitored is indicative of a critical event. The critical event may include an inability of the web analytics program to retrieve at least a portion of the server data in order to summarize the data in the one or more periodic reports within a predetermined time period. In further embodiments, the second status indicator is a critical status indicator signifying that at least one server-specific metric monitored is indicative of a critical event.

In some embodiments of the system, the monitoring program is further configured to receive server data from a plurality of network servers. In some embodiments, the server-specific metrics include at least one of server free disk space, server available memory, server on-line/off-line status, report processing time, difference between system time and log file time, and table size details.

In some embodiments of the system, the monitoring program is further configured to generate an alert in response to at least one server-specific metric monitored being outside of an acceptable value. The alert may include at least one of an SMS communication, an email, or an audible alarm.

Additionally, in some embodiments of the system, the monitoring program may be further configured to automatically take corrective action in response to one or more monitored server-specific metrics being outside of an acceptable value. The monitoring program may include a graphical user interface. In some particular embodiments, the web analytics program includes current web analytics products as mentioned above.

In another embodiment, a computer program product for monitoring a web analytics program is provided. The computer program product includes a non-transitory computer readable medium that includes computer-readable instructions. The instructions include instructions for receiving server data from at least one network server. The instructions additionally include instructions for receiving data from a web analytics program associated with the at least one network server. The instructions further include instructions for monitoring server-specific metrics via communication with the at least one network server and/or the web analytics program. The instructions additionally include instructions for presenting a first status indicator signifying a healthy status of the web analytics program in response to each of the server-specific metrics monitored being within acceptable values. Additionally, the instructions may include instructions for presenting a second status indicator signifying that at least one server-specific metric monitored being outside of an acceptable value.

In some embodiments of the product, the second status indicator is a cautionary status indicator signifying that precautionary action may be necessary to prevent a critical event. In some such embodiments, the product further includes instructions for presenting a third status indicator signifying that at least one server-specific metric monitored is indicative of a critical event. The critical event may include an inability of the web analytics program to retrieve at least a portion of the server data in order to summarize the data in the one or more periodic reports within a predetermined time period. In further embodiments, the second status indicator is a critical status indicator signifying that at least one server-specific metric monitored is indicative of a critical event.

In some embodiments of the product, the instructions additionally include instructions for receiving server data from a plurality of network servers. In some embodiments, the server-specific metrics include at least one of server free disk space, server available memory, server on-line/off-line status, report processing time, difference between system time and log file time, and table size details.

In some embodiments of the product, the instructions further include instructions for generating an alert in response to at least one server-specific metric monitored being outside of an acceptable value. The alert may include at least one of an SMS communication, an email, or an audible alarm.

Additionally, in some embodiments of the product, the instructions further include instructions for automatically taking corrective action in response to one or more monitored server-specific metrics being outside of an acceptable value. The product may further include instructions for interacting with a user via a graphical user interface. In some particular embodiments, the web analytics program includes current web analytics products as mentioned above.

The features, functions, and advantages that have been discussed may be achieved independently in various embodiments of the invention or may be combined with yet other embodiments, further details of which can be seen with reference to the following description and drawings.

BRIEF DESCRIPTION OF THE DRAWINGS

Figure 1:
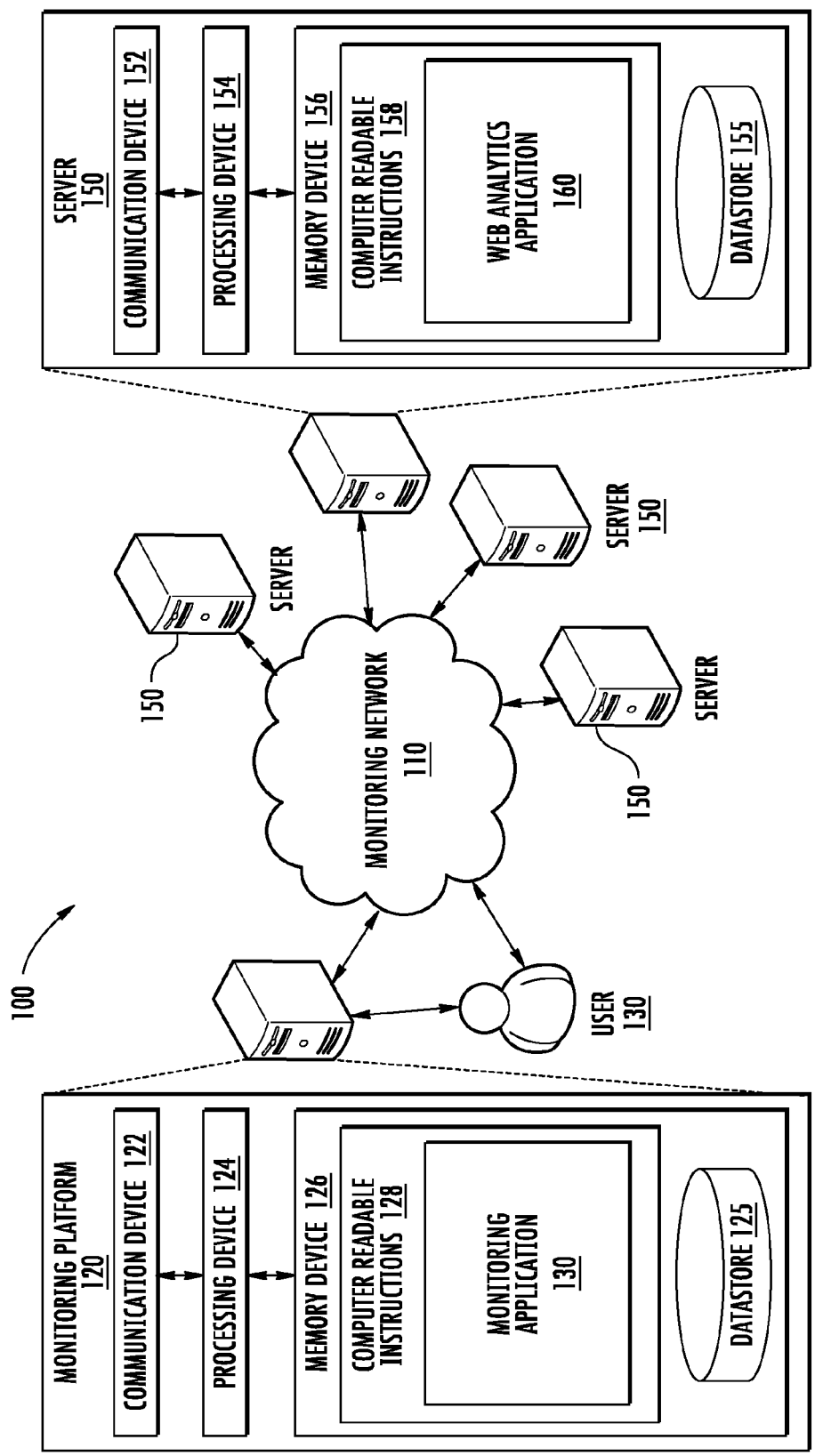
Figure 2:
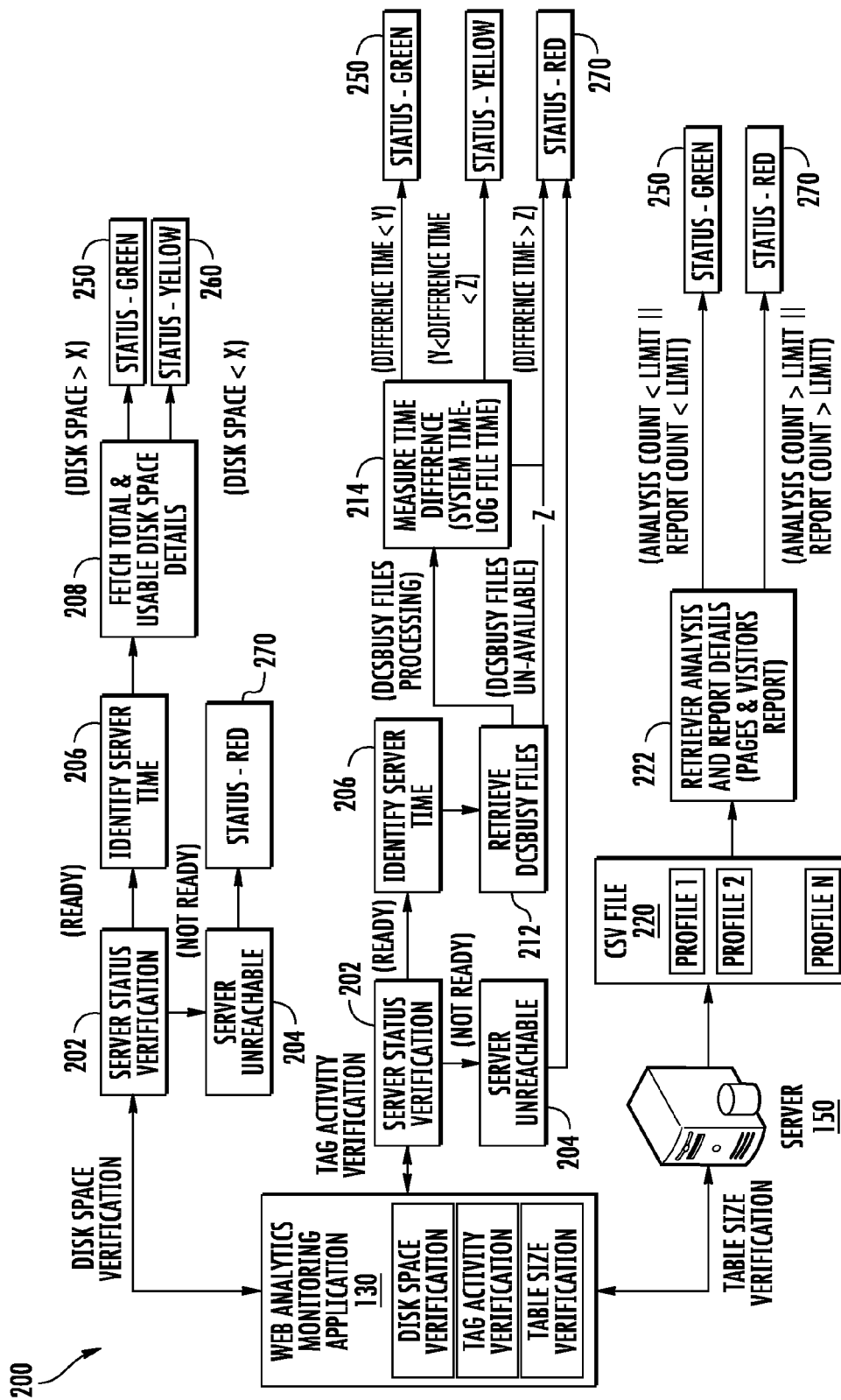
Figure 6:
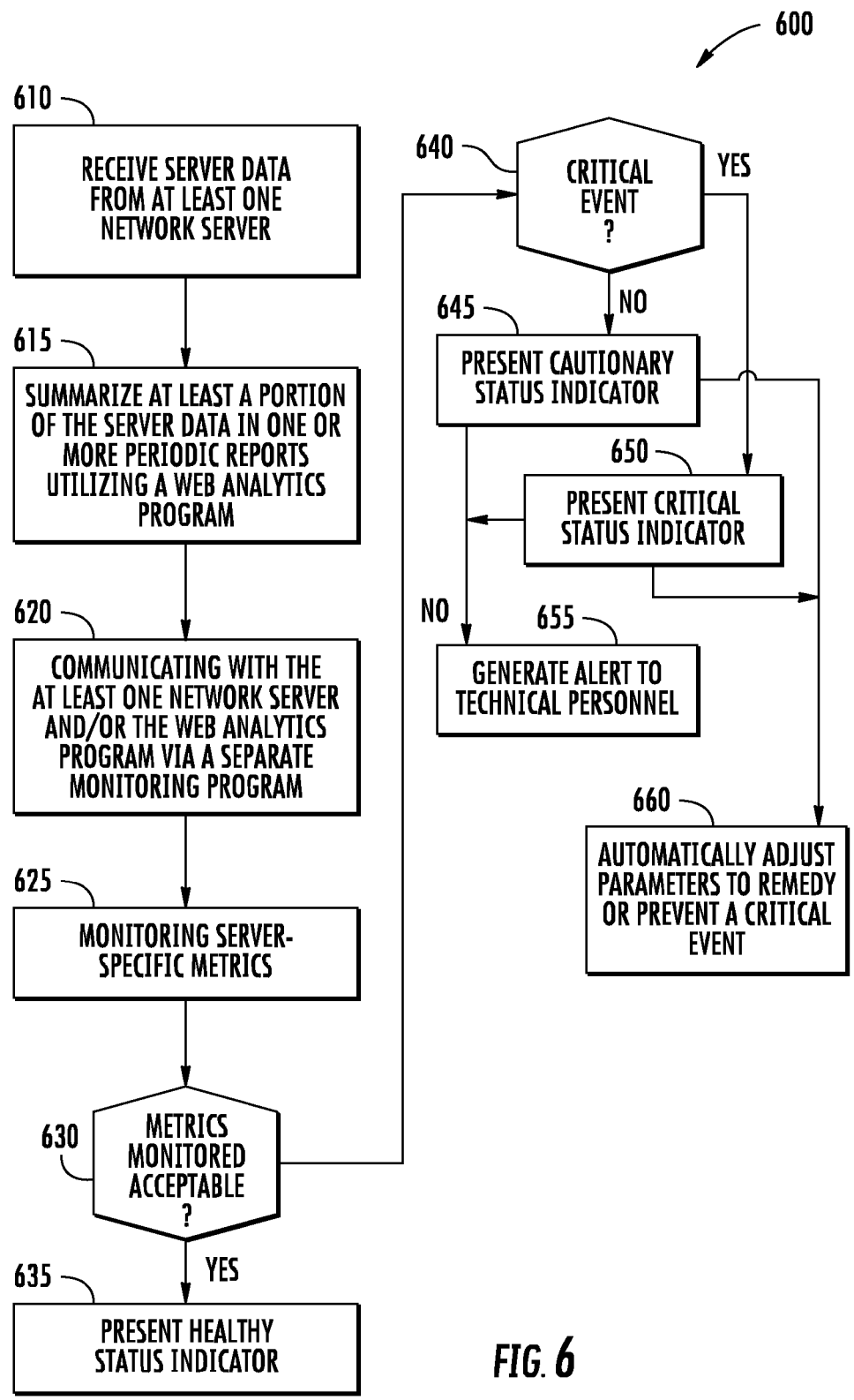

Having thus described embodiments of the invention in general terms, reference will now be made to the accompanying drawings, which are not necessarily drawn to scale, and wherein:

FIG. 1 is a block diagram illustrating a web analytics monitoring system, in accordance with an embodiment of the invention;

FIG. 2 is a mixed block and flow illustrating web analytics monitoring system, in accordance with an embodiment of the invention;

FIG. 3A is a sample display illustrating tag activity verification, in accordance with an embodiment of the invention;

FIG. 3B is a sample display illustrating individual active log files for Server 5 of FIG. 3A, in accordance with one embodiment of the present invention;

FIG. 4 is a sample display illustrating disk space verification, in accordance with one embodiment of the present invention;

FIG. 5 is a sample display illustrating table size verification, in accordance with an embodiment of the invention; and FIG. 6 is a flow diagram illustrating a method of monitoring a web analytics program/server, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in one or more software modules (also referred to herein as computer-readable code portions) executed by a processor or processing device and configured for performing certain functions, or in a combination of the two. A software module may reside in RAM memory, flash memory, ROM memory, EPROM memory, EEPROM memory, registers, a hard disk, a removable disk, a CD-ROM, or any other form of non-transitory storage medium known in the art. An exemplary storage medium may be coupled to the processing device, such that the processing device can read information from, and write information to, the storage medium. In the alternative, the storage medium may be integral to the processing device. Further, in some embodiments, the processing device and the storage medium may reside in an Application Specific Integrated Circuit (ASIC). In the alternative, the processing device and the storage medium may reside as discrete components in a computing device. Additionally, in some embodiments, the events and/or actions of a method or algorithm may reside as one or any combination or set of codes or code portions and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions, code, or code portions on a computer-readable medium. Computer-readable media includes both non-transitory computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, systems and computer program products are described herein that provide for monitoring and analysis of network servers and web analytics programs. For example, a monitoring program configured to monitor the status of web analytics program(s) associated with one or more network servers is contemplated herein. The monitoring program may monitor server-specific metrics such as server free disk space, server available memory, server on-line/off-line status, report processing time, difference between system time and log file time, table size details, etc. In monitoring such data, the program may be configured to present status indicators to the user wherein the status indicator may be indicative of the health of the web analytics program. Such a tool is beneficial, especially in instances such that a user must monitor or is otherwise responsible for web analytics data for a plurality of network servers. Indeed, in some embodiments, a user may receive an alert generated by the monitoring program regarding a change in web analytics program status. Further, the monitoring program may be configured, in some embodiments, to automatically take corrective action to remedy or prevent a critical event that may cause loss of data or delay web analytics reporting.

In accordance with embodiments of the invention, the term "web analytics" is the measurement, collection, analysis, and reporting of internet data for purposes of understanding and optimizing web usage. A "web analytics program" is a program designed to accomplish such.

In accordance with embodiments of the invention, the term "server-specific metrics" refers to measurable variables or status indicators associated with a specific server or a web analytics program that is associated with the specific server.

In accordance with embodiments of the invention, Information on installation, functionality and features of some web analytics products is detailed in "WebTrends Analytics Software Implementation and Maintenance Guide," Jun., 2008 edition by WebTrends Inc., which is incorporated herein by reference.

FIG. 1 illustrates an embodiment of a web analytics monitoring system 100 that may be utilized to monitor the health of servers and/or the web analytics programs associated therewith. As illustrated, the system 100 may include a monitoring platform 120 in communication with a plurality of servers 150 connected via monitoring network 110. A user 140 may be associated with the monitoring platform 120. Typically, such users 140 are technical personnel tasked with monitoring one or more servers 150. As illustrated, the monitoring platform 120 and the servers 150 each include a communication device 122 and 152, processing device 124 and 154, memory device 126 and 156, computer readable instructions 128 and 158, and a datastore 125 and 155.

As used with respect to the monitoring platform 120 and the servers 150, a "communication interface" 122 and 152 may generally include a modem, server, transceiver, and/or other device for communicating with other devices on a network. A "processing device," 124 and 154 may generally refer to a device or combination of devices having circuitry used for implementing the communication and/or logic functions of a particular system. For example, a processing device 124, 154 may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device may further include functionality to operate one or more software programs based on computer-executable program code thereof, which may be stored in a memory device 126, 156. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 124, 154 may be configured to use the communication device 122, 152 to transmit and/or receive data and/or commands to and/or from other devices within the monitoring network 110.

A "memory device" 126, 156 may generally refer to a device or combination of devices that store one or more forms of computer-readable media for storing data and/or computer-executable program code/instructions. For example, in one embodiment, the memory device 126, 156 may include any computer memory that provides an actual or virtual space to temporarily or permanently store data and/or commands provided to the processing device 124, 154 when it carries out its functions described herein. In one embodiment, the memory device 126 of the monitoring platform 120 includes computer readable instructions 128 that include a monitoring application 130 discussed more fully below. Furthermore, the memory device 156 of the servers 150 includes computer readable instructions 158 that include a web analytics application 160 discussed more fully below. Additionally, in some embodiments, the memory device 126, 156 includes a datastore 125, 155 or database configured for storing information and/or data. In other embodiments, the datastore 125, 155 may be housed remotely from the monitoring platform 120 and the monitoring platform system 120 is in communication with the datastore 125, 155 across the network 110 and/or across some other communication link.

The monitoring network 110 may include a local area network (LAN), a wide area network (WAN), and/or a global area network (GAN). The network 110 may provide for wireline, wireless, or a combination of wireline and wireless communication between devices in the network. In some embodiments, the network 110 may include a wireless telephone network. In some embodiments, the network 110 includes the Internet. In some embodiments, the network 110 includes an intranet. Furthermore, the network 110 may include a combination of an intranet and the Internet. For example, in one embodiment, the network 110 includes an intranet as well as the Internet accessible via a De Militarized Zone (DMZ).

The web analytics application 160 may include any type of application capable of web analytic processes. Various manufacturers and developers produce web analytics programs.

Web analytics is not necessarily simply a tool for measuring website traffic, but can be used as a tool for business research and market research. Web analytics applications can also help companies measure the results of traditional print advertising campaigns. It helps one to estimate how traffic to a website changes after the launch of a new advertising campaign. Web analytics provides information about the number of visitors to a website and the number of page views. It helps gauge traffic and popularity trends which is useful for market research.

There are two categories of web analytics; off-site and on-site web analytics. Off-site web analytics refers to web measurement and analysis regardless of whether you own or maintain a website. It includes the measurement of a website's potential audience (opportunity), share of voice (visibility), and buzz (comments) that is happening on the Internet as a whole.

On-site web analytics measure a visitor's journey once on your website. This includes its drivers and conversions; for example, which landing pages encourage people to make a purchase. On-site web analytics measures the performance of your website in a commercial context. This data is typically compared against key performance indicators for performance, and used to improve a web site or marketing campaign's audience response.

Historically, web analytics has referred to on-site visitor measurement. However in recent years this has blurred, mainly because vendors are producing tools that span both categories. Many different vendors provide on-site web analytics software and services. There are two main technological approaches to collecting the data. The first method, log file analysis, reads the log files in which the web server records all its transactions. The second method, page tagging, uses JavaScript on each page to notify a third-party server when a page is rendered by a web browser. Both collect data that can be processed to produce periodic reports.

The monitoring application 130 may be best described with reference to FIG. 2. FIG. 2 illustrates an embodiment of a web analytics monitoring system 200. As illustrated, the web analytics monitoring application 130 interacts with various components of the server and/or web analytics application 160 to properly monitor the health of the web analytics process. Importantly, while FIG. 2 illustrates three particular verification methods that the application 130 may incorporate (i.e., disk space verification, tag activity verification, and table size verification), it will be appreciated that the monitoring application 130 may monitor any variable, status identifier, or component of the servers 150 or web analytics application 160 that may feasibly be related in determining the health of an active web analytics application 160 and/or the server 150 in which the application 160 is associated. The metrics that are monitored are server-specific metrics. Exemplary server-specific metrics that may be monitored in assessing the web analytics application 160 health include server free disk space, server available memory (e.g., RAM), CPU utilization, operating system level error messages, server on-line/off-line status, report processing time, difference between system time and log file time, and table size details.

Depending on the server-specific metric that is monitored, the monitoring application 130 may be configured to present a status indicator to a user through, for instance, a display screen or monitor (not shown). For example, in one embodiment, the monitoring application 130 is configured to present an indicator that signifies that the web analytics application 160 is healthy and functioning properly if the monitored server-specific metrics are within an acceptable range and a separate indicator that signifies a problem or potential problem that is indicated by one or more monitored server-specific metrics being outside of an acceptable range. For instance, the monitoring application 130 serves to assist in preventing or promptly remedying critical events, which generally relates to the inability of the web analytics application 160 to properly collect data and generate desired periodic reports. Furthermore, the monitoring application 130 may include multiple different status indicators that may be indicative of the degree of the problem or potential problem. For example, in one embodiment, a cautionary status indicator is presented that signifies that precautionary action may be necessary in order to prevent a critical event. In some embodiments, a critical status indicator is presented that signifies that a critical event has taken place or is imminent. The status indicator may be presented to the user 140 by any means, such as textual display, flashing display, audible alarm, etc. In one particular embodiment, the status indicators are colors such as green signifying a healthy status, yellow signifying a cautionary status, and red signifying a critical status. Such an embodiment is illustrated in FIG. 2 at blocks 250, 260, and 270 respectively.

One server-specific metric that the monitoring application 130 may monitor is tag activity verification as illustrated in FIG. 2. Generally, the monitoring application 130 may first ping the server 150 in order to verify the server status as illustrated at block 202. In the event that the server 150 is unreachable as represented by block 204, the status indicator presented may signify critical status. In the embodiment illustrated, a "red" status indicative of a critical event is presented to the user as represented by block 270. If the server 150 is reachable, the process advances to block 206 where the server time is identified. Generally, the server time is essentially the present time and date at the location of the server 150.

Once the server time is identified, the process moves to block 212 where .DCSbusy files are retrieved. DCSbusy files are log files within specific web analytics products that are actively being written to. The files are termed "DCSbusy files" due to their file extension being *.dcsbusy while being actively written to. The file extension changes to *.log once the files rotation period (or size) has been reached and the file is no longer actively written to. Of note, those skilled in the art appreciate that while FIG. 2 illustrates the "active log files" being retrieved as DCSbusy files, the present invention may be applied to other web analytics applications 160 and their associated active log files.

As further illustrated in FIG. 2, if the DCSbusy files are unavailable for a server 150, a critical status indicator (in this case "red") is presented to the user 140. Indeed, if no log files are being actively written to, then a critical event has occurred as no data is being recorded. If the DCSbusy files are processing, the process moves to block 214 where the difference between the system time and the last edit to the DCSbusy file(s) is computed. Thus, even if a DCSbusy file exists indicating that a log file is being actively written to, a substantial delay in time from the system time to the latest edit to the DCSbusy file may be cause for concern. As illustrated if the difference between the system time and the log file edit time is less than a predetermined value "y," then it is likely that the server 150 is functioning properly and actively writing to the DCSbusy file(s). In such cases, a healthy status indicator may be presented such as the "green" status illustrated at block 250. Conversely, in the embodiment illustrated, if the difference in time exceeds "y" but is less than "z," then the user 140 may have cause for concern as the server 150 may have delayed writing to one or more DCSbusy files for longer than normal. In such cases, a caution status indicator may be presented such as the "yellow" status indicator illustrated at block 260. Finally, in the illustrated embodiment, if the difference in time exceeds "z," it is likely that a critical event has occurred and the server 150 will likely not resume writing to the DCSbusy file absent technical support. As such, a critical status indicator may be presented to the user 140 such as the "red" status indicator illustrated at block 270. "y" and "z" may be predetermined values or values determined and input by the user 140. For example, "y" may generally be approximately 30 minutes to approximately 3 hours, in some embodiments, approximately 45 minutes to approximately 2 hours, and in further embodiments approximately 1 hour to approximately 2 hours. In one particular embodiment, "y" is approximately 1 hour. "z" may generally be approximately 30 minutes to approximately 5 hours, in some embodiments, approximately 1 hour to approximately 4 hours, and in further embodiments, approximately 1.5 hours to approximately 3 hours. In on particular embodiment, "z" is approximately 2 hours.

Turning to FIG. 3A, a sample display of tag activity verification 300 is illustrated. As shown in this example, ten servers 150 are being monitored. As illustrated, the system date and time is recorded for each server 150. The system time is utilized to measure the time difference since the latest DCSbusy file update. As shown, Servers 1-3 and 5-10 are indicated as comprising a "healthy" status as none of the DCSbusy files have a time difference from the server time greater than "y." However, Server 4 is indicated as comprising a "critical" status as there are zero DCSbusy files (i.e., no data is being written to a log file).

In some embodiments, the user 140 may select individual servers 150 to retrieve further details on the individual DCSbusy files associated with each server 150. FIG. 3B illustrates a sample display of the three DCSbusy files associated with Server 5 in FIG. 3A. As illustrated in this example, the time difference between logfile1 and logfile2 and the server time is 22 minutes whereas the time difference between logfile3 and the server time is 31 minutes. In this example, "y" is 1 hour and each of the time differences are less than 1 hour. As such, a "healthy" status indicator for each log file is presented to the user 140.

Referring back to FIG. 2, another server-specific metric that may be monitored includes server disk space. In the illustrated embodiment, the monitoring application 130 may again verify the server status as illustrated at block 202. Again, if the server 150 is unreachable, a "critical" status indicator may be presented to the user 140 as illustrated at block 270. If the server 150 is reachable, the process proceeds to block 206 where the server time is identified. The server time may be utilized, for instance, in analyzing the change in available disk space over time. Such data may be advantageous, for example, in computing a time period in which a critical event may occur once the free disk space nears or exceeds cautionary levels. In some embodiments, the monitoring application 130 may automatically act to free additional disk space prior to reaching critically low levels, as discussed further below.

The total and usable disk space details for each server 150 are then retrieved as illustrated at block 208. If the free disk space is greater than a predetermined value "x," a "healthy" status indicator is presented to the user 140 as illustrated by the "green" status at block 250. Conversely, if the free disk space is less than predetermined value "x," a "caution" status indicator may be presented to the user 140 as illustrated by the "yellow" status at block 260. Indeed, if the free disk space is less than a predetermined value "x," the server 150 may be at risk of problems associated with inadequate free disk space. "x" may be any amount and may be selected by the user 140.

In theory, as technology progresses an acceptable value for "x" will likely increase, thus "x" may be set to any feasible value. However, in some embodiments, "x" is approximately 1 gigabyte (GB) to approximately 1 terabyte (TB), in some embodiments, approximately 10 GB to approximately 500 GB and in further embodiments, approximately 10 GB to approximately 100 GB. In one particular embodiment, "x" is approximately 15 GB.

Of note, while not illustrated in FIG. 2, another predetermined value for free disk space (which is less than "x") may be set that would be indicative of a critical event (i.e., the free disk space is so minimal that the server 150 is likely impaired). Such a predetermined value may generally approximately 0-1 GB. As will be appreciated by those skilled in the art, the "free disk space" may also be measured as an available percentage of the total disk space (which may be more prone to remaining constant over time). For example, in one embodiment, a "caution" status indicator may be presented if the free disk space drops below approximately 20% of the total disk space. A "critical" status indicator may be presented if the free disk space drops below approximately 5% of the total disk space, and in some embodiments, less than approximately 1% of the total disk space.

Turning now to FIG. 4, a sample display for disk space verification 400 is illustrated. As illustrated, the monitoring application 130 is monitoring ten servers 150 in the example. The system time, total disk space, and free disk space is presented along with the appropriate status indicator. In this example, Servers 1-8 have approximately 74 GB of free disk space of a total disk space of 80 GB. Servers 9 and 10 have approximately 33 GB and 23 GB, respectively of free disk space available with approximately 80 GB of total disk space. In this example "x" is less than 23 GB (in this example, "x" equals approximately 15 GB), thus each of the ten servers 150 are indicated as comprising a "healthy" status. If either of the servers 150 in the illustrated example would have presented a free disk space value of less than 15 GB, a "caution" status indicator would have been presented to the user 140.

Referring back again to FIG. 2, another server-specific metric that may be monitored includes table size. As illustrated, the monitoring application communicates with a server 150 and accesses a comma separated value (CSV) file that contains data relating to one or more periodic reports produced by the web analytics application 160. A CSV file format is a set of file formats used to store tabular data in which numbers and text are stored in plain textural form that can be read in a text editor. CSV is a relatively simple file format that is widely supported, so it is often used to move tabular data between different computer programs that support compatible CSV formats. For example, a CSV file might be used to transfer information from a database program to a spreadsheet.

Once the CSV file(s) has been accessed, the monitoring program 130 may access information relating to each profile. As illustrated in FIG. 2, the CSV file 220 may include any number of "n" profiles where "n" is any whole number greater than zero. Each profile corresponds with one or more reports that the web analytics application 160 may produce. The purpose of accessing the CSV file(s) 220 is to provide details on the table sizes associated therewith. Because all records in a log must be analyzed to report accurate statistics, the database for many report tables can grow quite large. In one embodiment, to prevent such tables from using the memory required for other tables and graphs, the user 140 may define a maximum table size. Once the size is reached, the table starts stops adding data. If the maximum size is not reached, all records are analyzed and an accurate report is produced.

Thus, after accessing the CSV file 220, the process moves to block 222 where analysis and report data is retrieved from the CSV file 220. As long as the analysis count and the report count is maintained at a level below a predetermined limit, the process will proceed to block 250 and present a "healthy" status such as the "green" status illustrated. However, if one or more analysis and/or report counts surpass the predetermined limit, the table will stop adding data, as mentioned above, and such data may be potentially lost. In such instances, a "critical" status indicator may be presented to the user 140 such as the "red" status illustrated at block 270.

FIG. 5 illustrates a sample display of a table size verification 500. As illustrated, various profiles are listed and page analysis status, page report status, visitors analysis status, and visitors report status are monitored. In this example, each report and analysis for each profile is processing within the predefined limit, and, as such, a "healthy" status indicator is displayed for each as illustrated in FIG. 5.

It should be noted that while FIG. 2 illustrates only three verification methods (disk size, tag activity, and table size), those skilled in the art will appreciate that any number and types of server-specific metrics may be monitored. Such other metrics include memory (e.g., RAM), CPU utilization, operating system level error messages, overall processing time, etc.

Referring now to FIG. 6, a method 600 for monitoring a web analytics program is illustrated. The process begins at block 610 where server data from at least one network server 150 is received. Of course, the server data may be received from a plurality of network servers 150 as described above. Once the data is obtained, a web analytics application 160 may be utilized in order to summarize at least a portion of the server data in one or more periodic reports as illustrated at block 615. In one embodiment, various periodic reports are produced daily, weekly, monthly, and yearly.

At block 620, a separate monitoring program 130 may be utilized to communicate with the at least one network server 150 and/or the web analytics application 160 associated therewith. The monitoring program 130 may then be permitted to monitor server-specific metrics as shown at block 625.

The method 600 next advances to decision block 630 where it is determined whether the monitored server-specific metrics are within acceptable values. If the values are acceptable, a "healthy" status indicator may be presented to the user 140 as indicated at block 635. On the other hand, if at least one server-specific metric monitored is not acceptable, the method 600 advances to decision block 640 where it is determined whether the monitored metric is indicative of a critical event. If the metric is not indicative of a critical event, the monitoring application 130 may present a "cautionary" status indicator to the user 140 as illustrated at block 645. Conversely, a "critical" status indicator may be necessary if the monitored metric is indicative of a critical event. In such cases, as illustrated at block 650, the monitoring application 130 may present a "critical" status indicator to the user 140.

Once the status indicator has been presented to the user 140, such as, for example, via a display monitor, in some embodiments, the monitoring application 130 may generate an alert to technical personnel as illustrated at block 655. Regarding alerts, the monitoring application 130 may be configured to generate an alert to a user 140 in the event of a status indicator change from "healthy" to "cautionary" or "critical" (or any type of status change). The alert may be an audible alarm, a short message service (SMS) to a mobile communication device, an email, etc. The ability to alert technical personnel promptly upon a change in status allows for personnel to quickly assess and rectify problems and potential problems in order to ensure that web analytic reports are produced timely. For example, if a table size problem exists, the user 140 may alter parameters such as increasing a table size limit for a specific report in order to ensure proper processing. In another example, if the free disk space drops to cautionary levels, the user 140 may opt to free more space by deleting temporary files, cached files, unnecessary or otherwise inactive files, etc. to reduce the likelihood of a critical event.

In addition to or instead of generating an alert to technical personnel (block 655), the monitoring application 130 may be configured to automatically adjust parameters to remedy or prevent a critical event as shown at block 660. Indeed, in some embodiments, specific actions may be taken to remedy commonly-occurring problems. The monitoring application 130 may utilize an algorithm or the like to automatically alter or otherwise adjust various parameters in response to a monitored server-specific metric being outside of an acceptable value. For example, referring back to FIG. 2, if the free disk space drops below "x," the monitoring application 130 may automatically act to free additional disk space by deleting temporary files, cached files, old log files or data, allocate additional space available on a separate storage device (or separate partition within the same storage device) within the server 150 or an external storage device (not shown) in communication with the server 150 via the network 110. In another example, still referring to FIG. 2, if the time difference between the DCSbusy files and the system time exceeds "y" or "z," the monitoring application 130 may automatically act as needed, such as, for example, resetting defaults and/or restarting the web analytics application 160. Furthermore, in yet another example, if a table size problem exists, the monitoring application 160 may automatically act to increase the table size limit for a specific report in order to ensure proper processing.

Thus, methods, systems and computer program products are described herein that provide for monitoring and analysis of network servers 150 and web analytics applications 160. For example, a monitoring program 130 configured to monitor the status of web analytics program(s) 160 associated with one or more network servers 150 is contemplated herein. The monitoring program 130 may monitor server-specific metrics such as server free disk space, server available memory, server on-line/off-line status, report processing time, difference between system time and log file time, table size details, etc. In monitoring such data, the program may be configured to present status indicators to the user 140 wherein the status indicator may be indicative of the health of the web analytics program 160. Such a tool is beneficial, especially in instances such that a user 140 must monitor or is otherwise responsible for web analytics data for a plurality of network servers. Indeed, in some embodiments, a user may receive an alert generated by the monitoring program regarding a change in web analytics program status. Further, the monitoring program may be configured, in some embodiments, to automatically take corrective action to remedy or prevent a critical event that may cause loss of data or delay web analytics reporting.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise. In this regard, the term "processor" and "processing device" are terms that are intended to be used interchangeably herein and features and functionality assigned to a processor or processing device of one embodiment are intended to be applicable to or utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for monitoring a web analytics program comprising:

receiving server data from a plurality of servers within an entity, wherein server data includes server-specific metrics relating to free disk space and table size of each of the plurality of servers;

summarizing, using a web analytics program, at least a portion of the received server data, wherein summarizing the at least a portion of the received server data includes creating one or more periodic reports;

communicating with the web analytics program to set-up a separate monitoring program to monitor a status of the server-specific metrics relating to free disk space and table size for each of the plurality of servers;

allowing the separate monitoring program to monitor the status of the server-specific metrics relating to free disk space and table size for each of the plurality of servers;

receiving server-specific metric values for each of the plurality of servers from the separate monitoring program;

identifying one or more critical events identified from the server-specific metric values received from the monitoring program, wherein the one or more critical events identify a problem or cautionary issue with a table size of one or more of the plurality of servers or a drop in free disk space that reaches a cautionary level for one or more of the plurality of servers;

presenting a first status indicator signifying a healthy status of one or more of the plurality of servers on an acceptable server- specific metric value received for the one or more of the plurality of servers presenting a second status indicator, the second status indicator indicating the identified one or more critical events where that precautionary action may be necessary;

wherein the second status indicator is a cautionary status indicator signifying that precautionary action may be necessary to prevent a critical event;

wherein the critical event comprises an inability of the web analytics program to retrieve at least a portion of the server data in order to summarize the data in the one or more periodic reports within a predetermined time period; and adjusting, automatically, one or more parameters to remedy one or more of the identified one or more critical events.

2. The method of claim 1, further comprising presenting a third status indicator signifying that at least one server-specific metric monitored is indicative of the critical event.

3. The method of claim 1, wherein the second status indicator is a critical status indicator signifying that at least one server-specific metric monitored is indicative of a critical event.

4. The method of claim 1, wherein the receiving server data comprises receiving server data from a plurality of network servers.

5. The method of claim 1, wherein the server-specific metrics comprise at least one of server, server available memory, server on-line/off-line status, report processing time, and difference between system time and log file time.

6. The method of claim 1, further comprising generating an alert in response to at least one server-specific metric monitored being outside of an acceptable value.

7. The method of claim 6, wherein the alert comprises at least one of an SMS communication, an email, or an audible alarm.

8. The method of claim 1, wherein the monitoring program automatically takes corrective action in response to one or more monitored server-specific metrics being outside of an acceptable value.

9. The method of claim 1, wherein the monitoring program comprises a graphical user interface.

10. A system for web analytics comprising:
a plurality of network servers, the servers comprising or otherwise in communication with a web analytics program configured to summarize server data in one or more periodic reports;
a monitoring program configured to:
receive server data from at least one network server within an entity;
determine server-specific metrics associated with each of the plurality of network servers based at least partially on the received server data, wherein server-specific metrics relate to free disk space and table size of each of the plurality of servers;
summarize at least a portion of the received server data, wherein summarizing the at least a portion of the received server data includes creating one or more periodic reports;
communicate with the web analytics program to monitor a status of the server-specific metrics relating to free disk space and table size for each of the plurality of network servers;
monitor the status of the server-specific metrics relating to free disk space and table size for each of the plurality of servers;
compare identified server-specific metric values for each of the plurality of network servers to a predetermined value;
identify one or more critical events identified from the comparison of server-specific metric values, wherein the one or more critical events identify a problem or cautionary issue with a table size of one or more of the plurality of servers or a drop in free disk space that reaches a cautionary level for one or more of the plurality of network servers;
present a first status indicator signifying a healthy status of one or more of the plurality of network servers on an acceptable comparison of the server-specific metric values for the one or more of the plurality of network servers;
present a second status indicator signifying that at least one server-specific metric monitored being outside of an acceptable value based at least partially on the comparison, wherein the at least one server-specific metric monitored being outside of the acceptable value indicates one or more critical events where precautionary action may be necessary;
wherein the second status indicator is a cautionary status indicator signifying that precautionary action may be necessary to prevent a critical event;
wherein the critical event comprises an inability of the web analytics program to retrieve at least a portion of the server data in order to summarize the data in the one or more periodic reports within a predetermined time period; and
adjust, automatically, one or more parameters to remedy one or more of the identified one or more critical events.

11. The system of claim 10, wherein the monitoring program is further configured to present a third status indicator signifying that at least one server-specific metric monitored is indicative of the critical event.

12. The system of claim 11, wherein the critical event comprises an inability of the web analytics program to retrieve at least a portion of the server data in order to summarize the data in the one or more periodic reports within a predetermined time period.

13. The system of claim 10, wherein the second status indicator is a critical status indicator signifying that at least one server-specific metric monitored is indicative of a critical event.

14. The system of claim 10, wherein the monitoring program is further configured to receive server data from a plurality of network servers.

15. The system of claim 10, wherein the server-specific metrics comprise at least one of server free disk space, server available memory, server on-line/off-line status, report processing time, difference between system time and log file time, and table size details.

16. The system of claim 10, wherein the monitoring program is further configured to generate an alert in response to at least one server-specific metric monitored being outside of an acceptable value.

17. The system of claim 16, wherein the alert comprises at least one of an SMS communication, an email, or an audible alarm.

18. The system of claim 10, wherein the monitoring program is further configured to automatically take corrective action in response to one or more monitored server-specific metrics being outside of an acceptable value.

19. The system of claim 10, wherein the monitoring program comprises a graphical user interface.

20. A computer program product for monitoring a web analytics program, the computer program product comprising a non-transitory computer readable medium comprising computer-readable instructions, the instructions comprising instructions for:
receiving server data from at least one network server within an entity, wherein server data includes server-specific metrics relating to free disk space and table size of each of the plurality of servers;
summarizing, based on received data from a web analytics program associated with the at least one network server, at least a portion of the received server data, wherein summarizing the at least a portion of the received server data includes creating one or more periodic reports;
monitoring server-specific metrics via communication with the at least one network server and/or the web analytics program, wherein monitor the status of the server-specific metrics further includes monitoring server-specific metrics relating to free disk space and table size for each of the plurality of servers;

comparing identified server-specific metric values for each of the plurality of network servers to a predetermined value;

identifying one or more critical events identified from the comparison of server-specific metric values, wherein the one or more critical events identify a problem or cautionary issue with a table size of one or more of the plurality of servers or a drop in free disk space that reaches a cautionary level for one or more of the plurality of network servers;

presenting a first status indicator signifying a healthy status of one or more of the plurality of network servers based on an acceptable the comparison of the server-specific metric values for the one or more of the plurality of network servers;

presenting a second status indicator signifying that at least one server-specific metric monitored being outside of an acceptable value based at least partially on the comparison, wherein the at least one server-specific metric monitored being outside of the acceptable value indicates one or more critical events where precautionary action may be necessary;

wherein the second status indicator is a cautionary status indicator signifying that precautionary action may be necessary to prevent a critical event;

wherein the critical event comprises an inability of the web analytics program to retrieve at least a portion of the server data in order to summarize the data in the one or more periodic reports within a predetermined time period; and adjusting, automatically, one or more parameters to remedy one or more of the identified one or more critical events.

21. The computer program product of claim 20, further comprising instructions for presenting a third status indicator signifying that at least one server-specific metric monitored is indicative of the critical event.

22. The computer program product of claim 21, wherein the critical event comprises an inability of the web analytics program to retrieve at least a portion of the server data in order to summarize the data in the one or more periodic reports within a predetermined time period.

23. The computer program product of claim 20, wherein the second status indicator is a critical status indicator signifying that at least one server-specific metric monitored is indicative of a critical event.

24. The computer program product of claim 20, wherein the receiving server data comprises receiving server data from a plurality of network servers.

25. The computer program product of claim 20, wherein the server-specific metrics comprise at least one of server free disk space, server available memory, server on-line/off-line status, report processing time, difference between system time and log file time, and table size details.

26. The computer program product of claim 20, further comprising instructions for generating an alert in response to at least one server-specific metric monitored being outside of an acceptable value.

27. The computer program product of claim 26, wherein the alert comprises at least one of an SMS communication, an email, or an audible alarm.

28. The computer program product of claim 20, further comprising instructions for automatically taking corrective action in response to one or more monitored server-specific metrics being outside of an acceptable value.

29. The computer program product of claim 20, further comprising instructions for interacting with a user via a graphical user interface.

* * * * *